Patented Sept. 29, 1931

1,825,248

UNITED STATES PATENT OFFICE

WILHELM PUNGS, OF LUDWIGSHAFEN-ON-THE-RHINE, AND KARL BEHRINGER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTS RESEMBLING NATURAL WAXES

No Drawing. Application filed April 5, 1929, Serial No. 352,903, and in Germany July 5, 1928.

The present invention relates to the production of products resembling natural waxes.

In several applications for patent, for example in the applications Ser. No. 254,604, filed February 15, 1928, and 252,037, filed February 4, 1928, one of the present inventors has described processes for the bleaching of, and production of valuable products from, crude or deresinified Montan wax according to which Montan wax is bleached by means of a solution of an oxidizing agent and, for the purpose of increasing the binding power of the products obtained, is treated with a larger quantity of oxidizing agents than is necessary for complete bleaching, whereupon, if desired, some of the carboxyl groups of the free organic acids present in the bleached Montan wax are converted into groups containing the —CO— group but which are free from carboxyl hydrogen atoms.

We have now found that new products resembling natural waxes in their physical properties are obtained by mixing the Montan wax bleached with the aid of solutions of oxidizing agents or similar bleached Montan wax, which can be obtained for example by purifying a Montan wax by distillation, or converted bleached Montan wax, with other organic acids of high molecular weight, in particular other fatty acids or aromatic or hydroaromatic acids, and then esterifying the free carboxyl groups present in the acids of the mixture either wholly or partially with polyhydric alcohols or mixtures of the same. As organic acids of high molecular weight, we may use to great advantage natural oily, fatty, resinous or waxy substances which contain free carboxyl groups, but these substances may also be replaced wholly or partially by aromatic or hydroaromatic acids such as naphthenic acids or salicylic acid and the like or mixtures thereof. The polyhydric alcohols may contain further substituents of any kind as for example carboxyl or halogen groups, the essential feature of these compounds being that they contain at least two hydroxyl groups capable of esterification as are present in glyceric aldehyde, dioxy-acetone sugars or mono-chlor glycerol; care should be taken in order to ensure proper reaction that these compounds are liquid, or at least liquid at the temperature at which the process is carried out; in the following we shall refer to these compounds as organic polyhydroxy compounds. The temperatures employed will usually range between about 100° and 200° centigrade, and preferably between 120° and 180° centigrade. We prefer to carry out the process with an addition of one or more of the well-known catalysts for promoting esterification, such as sulphur dioxide, sulphuric acid, sulphonic acids of organic compounds, such as benzene, toluene, or naphthalene sulphonic acids, phosphoric acid or hydro-chloric acid. In case the resulting products still contain free carboxyl groups, these may be converted wholly or partially into salts or mixtures of different salts or into esters or other derivatives in which the —CO— group still remains, for example anhydrides or amides.

The properties of the products obtained in accordance with the present invention may be varied by adding solid or liquid hydrocarbons, oils, fats, waxes or resins which are free from carboxyl groups, or mixtures of these substances, either before, during or after the esterification.

The following examples will further illustrate the nature of this invention but the invention is not restricted to these examples.

*Example 1*

220 kilograms of fatty acids obtained from cocoa nut oil are heated with 150 kilograms of ethylene glycol with the addition of 1 kilogram of 40 per cent sulphuric acid for about an hour at from 120° to 130° centigrade and then 1000 kilograms of a Montan wax, highly bleached with the aid of 180 per cent its weight of $CrO_3$ while suspended in sulphuric acid, and consisting mainly of free acids, 100 kilograms of stearin and 40 kilograms of wool grease are added and the whole is then heated for another three hours at from 120° to 130° centigrade. The product so obtained is soft, sufficiently plastic to be kneaded, but not glutinous, and has a very clear colour.

By mixing 100 kilograms of paraffin wax with each 400 kilograms of the above product while melting, the flexibility is increased.

The esterification may also be effected by means of 300 kilograms of polyglycol (a mixture of polymers of ethylene glycol, chiefly composed of HO—CH$_2$—CH$_2$—O—CH$_2$—CH$_2$—OH) instead of 150 kilograms of ethylene glycol.

*Example 2*

100 kilograms of a Montan wax, bleached with the aid of 170 per cent its weight of CrO$_3$ while suspended in sulphuric acid, 20 kilograms of the fatty acids of palm nut oil, 10 kilograms of benzoic acid and 5 kilograms of the fatty acids of wool grease are heated to between about 120° and 130° centigrade for 5 hours, while stirring, with 150 kilograms of glycerol and 0.5 kilogram of sulphuric acid. The resulting product has properties similar to those of the product described in Example 1.

*Example 3*

20 kilograms of the fattly acids of cocoa nut oil, 5 kilograms of naphthenic acids and 7 kilograms of ethylene glycol are heated for half an hour to 160° centigrade, while stirring, whereupon 100 kilograms of Montan wax, bleached by the process of the aforesaid application Ser. No. 254,604, are added and the mass is heated for 4 further hours to between 120° and 130° centigrade. 9 kilograms of benzyl alcohol are then added and heating is continued for another hour.

*Example 4*

20 kilograms of the fatty acids of cocoa nut oil, 5 kilograms of stearin and 8 kilograms of ethylene glycol are heated, while stirring, for half an hour to 120° centigrade, whereupon 100 kilograms of Montan wax, bleached according to the aforesaid application Ser No. 252,037, are added and heating to the said temperature is continued for another 4 hours. 2 kilograms of calcium oxide are then added to the melt and stirring is continued until the melt has become clear. The resulting product is somewhat harder than the products obtained according to Examples 1 to 3, but is better suitable for combining with oils.

What we claim is:—

1. The process of producing products resembling natural waxes which comprises heating a bleached Montan wax containing free acids with another organic acid of high molecular weight and an organic polyhydroxy compound until at least partial esterification occurs.

2. The process of producing products resembling natural waxes which comprises heating an oxidation bleached Montan wax containing free acids with another organic acid of high molecular weight and an organic polyhydroxy compound to between about 100° and 200° centigrade until at least partial esterification occurs.

3. The process of producing products resembling natural waxes which comprises heating an oxidation bleached Montan wax containing free acids with another organic acid of high molecular weight and a polyhydric alcohol until at least partial esterification occurs.

4. The process of producing products resembling natural waxes which comprises heating an oxidation bleached Montan wax containing free acids with another organic acid of high molecular weight and ethylene glycol until at least partial esterification occurs.

5. As new articles of manufacture, products resembling natural waxes comprising mixed esters of the free acids contained in bleached Montan wax and of another organic acid of high molecular weight with an organic polyhydroxy compound.

6. As new articles of manufacture, products resembling natural waxes comprising mixed esters of the free acids contained in oxidation bleached Montan wax and another organic acid of high molecular weight with a polyhydric alcohol.

7. As new articles of manufacture, products resembling natural waxes comprising mixed esters of the free acids contained in oxidation bleached Montan wax and another organic acid of high molecular weight with ethylene glycol.

In testimony whereof we have hereunto set our hands.

WILHELM PUNGS.
KARL BEHRINGER.

CERTIFICATE OF CORRECTION.

Patent No. 1,825,248.  September 29, 1931.

WILHELM PUNGS ET AL.

It is hereby certified that error appears in the printed specification of the above numbered patent requiring correction as follows: Page 1, line 46, for the misspelled word "carboxyl" read "carbonyl"; and line 50, after the compound word "dioxy-acetone" insert a "comma"; and that the said Letters Patent should be read with these corrections therein that the same may conform to the record of the case in the Patent Office.

Signed and sealed this 20th day of December A. D. 1932.

(Seal)

M. J. Moore,
Acting Commissioner of Patents.